INVENTORS
LUTZ HORN
FRITZ PHILIPP
HEINZ HAAKE

United States Patent Office 3,442,717
Patented May 6, 1969

3,442,717
PROCESS FOR ENVELOPING BATTERY ELECTRODE PLATES IN SEPARATORS
Lutz Horn, Hagen, Westphalia, Fritz Philipp, Hagen-Haspe, Westphalia, and Heinz Haake, Rummenohl, Westphalia, Germany, assignors to Varta Aktiengesellschaft, Hagen, Westphalia, Germany
Filed Oct. 1, 1965, Ser. No. 492,171
Claims priority, application Germany, Oct. 2, 1964,
V 26,890
Int. Cl. H01m 3/04
U.S. Cl. 136—176
4 Claims

ABSTRACT OF THE DISCLOSURE

The flat negative and positive plates for a battery are assembled by enclosing them between two strips of suitable separator material and then fusing the material together between adjacent plates so that the plates are contained in pockets formed by the separator strips.

This invention relates generally to electric storage batteries and more particularly to a process and apparatus for automatically enveloping battery electrode plates in a suitable separator material.

Previous methods for enclosing sets of electrodes in a suitable separator material have been costly in labor and produced assemblies lacking uniform, high-grade consistency. The present invention is designed to overcome these difficulties by providing a process which is easily automated so it can be used to provide high quality, low cost items by mechanical means which may be operated hydraulically, pneumatically or electrically.

The preferred structural embodiment of the invention utilizing the preferred method for enveloping battery electrode plates, comprises a welding table or surface upon which individual battery electrode plates, which are made of magnetic material, are spaced from a feeder and a pressure beam containing a group of welding electrodes and rubber-covered magnetic plates. A first band or strip of a separator material is placed over a set of electrode plates lying flat and the pressure beam is pressed down into contact with the separator strip. The pressure beam is then raised, magnetically lifting the electrodes or battery plates with the separator strip resting thereover. A second separator strip is then laid down on the welding table and the pressure beam is lowered. The separator bands or strips are then welded or fused together between the plates by the welding electrodes. The pressure beam is then raised again and the set of enveloped electrodes or battery plates in connected pockets is removed and the steps repeated for another set of plates.

An object of the present invention is, therefore, to provide a process and apparatus for automatically enveloping electrode sets in separator material.

Another object of the present invention is to provide an automatic enveloping process wherein the articles produced are of a uniform high quality.

Still another object is to reduce the cost of enveloping electrode sets.

Yet another object is to provide an apparatus and process which will greatly increase the rate of production of enveloped electrode sets while maintaining uniform high quality.

Figure 1:
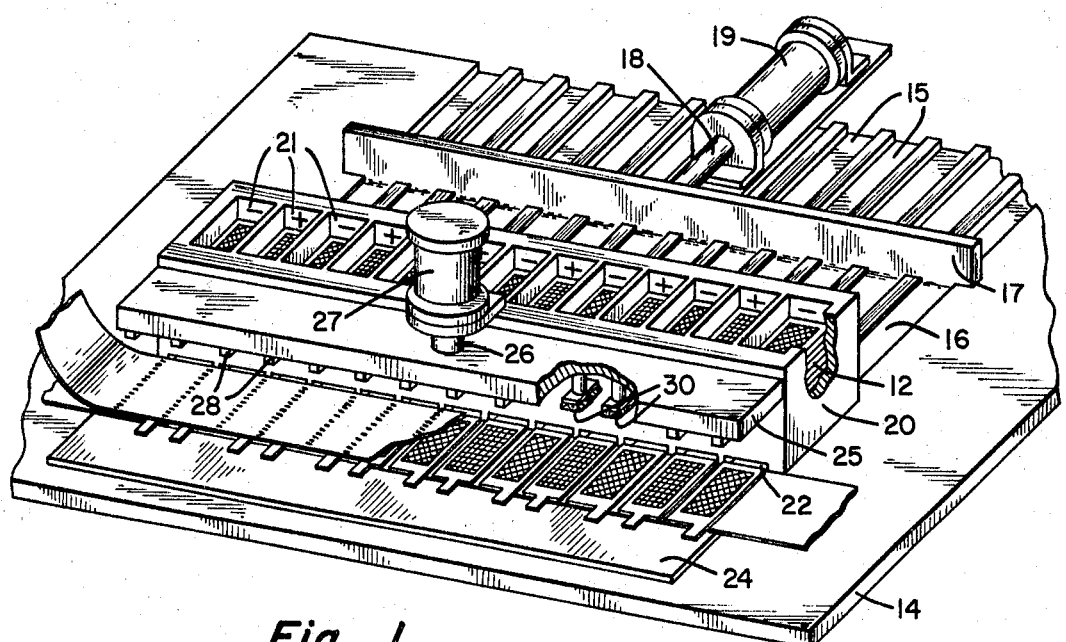
Figure 2:
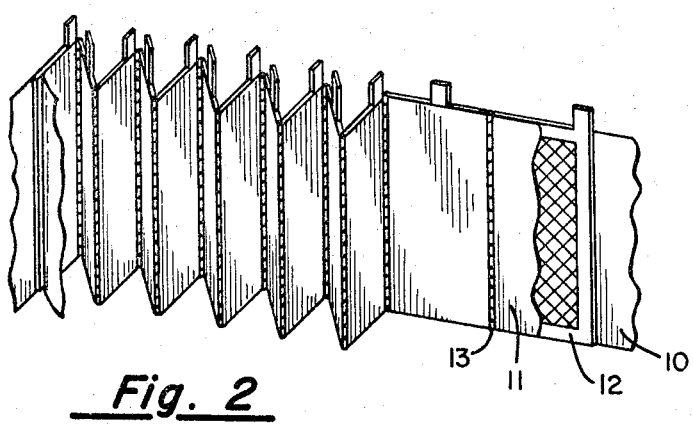

Other objects and advantages of the invention will become apparent during the course of the following detailed description with reference to the accompanying drawings in which:

FIG. 1 is a top-right perspective view of a preferred structural embodiment of the invention containing portions cut away to reveal details of the construction; and FIG. 2 is a perspective view of an enveloped electrode set produced in accordance with the teachings of this invention.

In the assembly constructed according to the teachings of this invention as illustrated in FIG. 2, between two sheets or strips of separator material 10 and 11, a series of battery electrode plates 12, preferably alternately positive and negative plates, lie side-by-side and spaced apart slightly from one another. The layers of separator material 10 and 11 are welded together at 13 across the width of the strip thereby forming pockets or envelopes with the electrodes 12 snugly held therein. As further illustrated in FIG. 2, once the assembly has been formed in this manner, the assembly consisting of sets of plates contained within the separator layers can be folded in a zig-zag or accordion pleated fashion suitable for use in the construction of a battery. A process for accomplishing this construction comprises the steps of initially placing a group of battery electrode plates, such as 12, flat, side-by-side and slightly spaced apart one from the other between two strips, such as 10 and 11, of suitable separator material and then bonding the strips together alongside each of the battery plates, as at 13. A more specific process involves the steps of initially placing a series of battery electrode plates, such as 12, flat, side-by-side, and spaced apart slightly on a suitable support, then covering the battery electrode plates with a strip of separator material, such as 10, of a suitable length. Next, the electrode plates with the covering separator strip are lifted off the support and a second strip of separator material, such as 11, is laid down underneath and then the plates brought back down again. Lastly, the two separator strips 10 and 11 are bonded together such as by welding alongside each of the battery electrode plates crosswise of their length such as shown at 13 in FIG. 2. This holds the respective electrode plates in their positions in a relatively snug fashion so that the assembly may be folded in a manner previously mentioned for eventual use as desired.

A machine capable of constructing the assembly of FIG. 2 in accordance with the described preferred process, is shown in FIG. 1. A main support plate 14 is provided with a series of parallel guide slots 15 on its top surface within which push bars 16 slide back and forth when driven by arm 17 which is attached to the rod 18 of actuator 19. Typically, actuator 19 may be a solenoid operated air cylinder, but no limitation thereto is intended. A feeder 20 is mounted to and elevated slightly above the support plate 14 and contains a set of adjacent magazines or compartments 21, each of which was behind and below it a corresponding push bar 16. Each compartment 21 contains a stack of battery electrode plates 12 which are made of a magnetic material. Preferably, positive and negative polarity plates are contained in alternate compartments. Each compartment 21 has a slot-like opening 22 at the bottom in the front and rear sides which is at least as wide as the width of a battery plate and is slightly higher than the thickness of one plate. The bars 16 have substantially the same thickness and width dimensions and are aligned with the slot openings so that when they are driven forward they push one plate in each compartment 21 out the bottom front slot 22. Forward of the feeder 20 and just below the slot openings is a flat welding table 24 which may be suitably mounted to the main support plate 14. The battery plates, when ejected from the compartments 21, lie flat on the welding table 24.

Above the welding table 24 is a pressure beam 25 which is driven up and down by the rod or piston 26 of another pneumatically operated actuator 27. The pressure beam 25 contains on its bottom side a series of elongated welding elements 28 which are arranged parallel to the long side of the battery plates and are spaced apart along the pressure beam 25 so that when the pressure beam is driven downward the welding elements 28 are located in the space between adjacent plates. Between each of the welding elements 28 on the underside of the pressure beam 25 is mounted a series of rubber covered magnetic plates 30 which are, of course, aligned to lie over a corresponding battery electrode plate when the pressure beam 25 is driven downward. Preferably, the magnetic plates 30 are merely flat permanent magnets covered with a layer of compressible rubber. As will become apparent from the following description of operation of this apparatus, the rubber serves to hold the battery plates 12 in position without damaging them when the pressure beam 25 is depressed and the magnetic plates serve to lift the battery plates when the pressure beam is raised.

Considering now the operation of the apparatus shown in FIG. 1, initially with the push bars 16 in the furthest rearward or withdrawn position, the compartments 21 in the feeder 20 are filled with stacks of electrode plates 12. Starting at the leftmost compartment, the compartments are alternately stacked with negative and positive plates. The push bar actuator 19 is then energized to drive the arm 17 forward far enough so that the push bars 16 slide forward in the guide slots 15 and eject a single electrode plate 12 from each of the compartments 21 out the front end slot 22 at the bottom of the compartments. The push bars are then withdrawn rearward to await another cycle. While the ejected electrode plates 12 are lying flat adjacent to and spaced-apart from one another on the welding table 24, a strip 10 of suitable length of heat-fusible separator material is laid over the electrode plates by means not shown. When the electrode plates lying on the welding table have been covered with the strip 10 of separator material, the pressure beam 25 is driven downward by rod 26 of actuator 27. The pressure beam is pushed firmly down onto the separator-covered electrode plates and then raised by the actuator 27. The rubber-covered magnetic plates 30 magnetically attract the electrode plates 12 to lift them and the covering strip of separator off the welding table. Another strip 11 of separator material of suitable length is then laid down, by means not shown, on the welding table 24 and once again the pressure beam 25 is driven downward by the actuator 27. This time while the pressure beam is firmly pressed downward on the covered plates, suitable electrical current is applied to the welding elements 28 causing them to weld together the two strips of separator material, 10 and 11, alongside each of the electrode plates 12. This forms the strip of pockets or envelopes which snugly hold a set of electrode plates. When the pressure beam 25 is raised once again after the weld has been made, the assembly is then stripped away from the beam and the previous steps repeated in correct sequence to construct identical assemblies having the same uniform construction at an economical rate.

We claim:
1. A process for enveloping battery electrode plates with separator material comprising the steps of:
 (a) placing a plurality of electrode plates side-by-side in spaced apart relationship flat upon a supporting member with adjacent plates having opposite polarity;
 (b) laying a first strip of heat-fusible separator material over said electrode plates;
 (c) lifting said electrode plates with the covering first strip of separator material from said supporting member;
 (d) laying a second strip of heat-fusible separator material substantially coextensive with said first strip upon said supporting member;
 (e) placing the separator-covered electrode plate down flat upon said second separator strip; and
 (f) fusing together said first and second separator strips alongside each of the electrode plates by applying heat and pressure thereto, thereby forming a strip containing a plurality of plate-enclosing envelopes.

2. The process according to claim 1 in which in step (a) the plurality of plates are placed simultaneously side-by-side upon the supporting member.

3. The process as described in claim 1 wherein said electrode plates are made of magnetic material and in step (c) the separator-covered electrode plates are all simultaneously lifted by magnetic force.

4. The process as in claim 1 in which in step (f) the separator strips are fused together alongside all of the electrode plates simultaneously.

References Cited

UNITED STATES PATENTS

| | | | |
|---|---|---|---|
| 2,343,970 | 3/1944 | Galloway | 136—147 XR |
| 2,635,128 | 4/1953 | Arbogast | 136—132 |
| 2,934,585 | 4/1960 | Zahn | 136—147 |
| 3,088,256 | 5/1963 | Brown | 53—29 XR |

A. B. CURTIS, *Primary Examiner.*

D. L. WALTON, *Assistant Examiner.*

U.S. Cl. X.R.

136—147